(12) United States Patent
Xu

(10) Patent No.: US 9,307,531 B2
(45) Date of Patent: Apr. 5, 2016

(54) RANDOM ACCESS METHOD, MOBILE TERMINAL, AND MOBILE COMMUNICATIONS SYSTEM

(71) Applicant: Huawei Technologies Co., Ltd., Shenzhen (CN)

(72) Inventor: Zixin Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/186,576

(22) Filed: Feb. 21, 2014

(65) Prior Publication Data

US 2014/0169344 A1    Jun. 19, 2014

Related U.S. Application Data

(63) Continuation of application No. PCT/CN2012/073632, filed on Apr. 9, 2012.

(30) Foreign Application Priority Data

Aug. 29, 2011    (CN) .......................... 2011 1 0251052

(51) Int. Cl.
*H04W 72/04* (2009.01)
*H04W 74/08* (2009.01)
*H04W 74/00* (2009.01)

(52) U.S. Cl.
CPC ...... *H04W 72/0446* (2013.01); *H04W 74/0833* (2013.01); *H04W 74/008* (2013.01)

(58) Field of Classification Search
CPC ....................... H04W 74/0833; H04W 72/0446
See application file for complete search history.

(56) References Cited

U.S. PATENT DOCUMENTS

2004/0121777 A1    6/2004 Schwarz et al.
2010/0226248 A1*   9/2010 Grilli ............................ 370/230
2010/0248731 A1    9/2010 Hsieh et al.

FOREIGN PATENT DOCUMENTS

CN    1505907 A    6/2004
CN    1964552 A    5/2007

(Continued)

OTHER PUBLICATIONS

Hsieh, Jung-Ta; Method of controlling channel access and related mobile device EP 2 234 418 A2 May 3, 2010.*

(Continued)

*Primary Examiner* — Yemane Mesfin
*Assistant Examiner* — Henry Baron
(74) *Attorney, Agent, or Firm* — Conley Rose, P.C.; Grant Rodolph

(57) ABSTRACT

The present invention discloses a random access method, a mobile terminal, and a mobile communications system, and relates to the communications field. The method includes: obtaining a dynamic probability class (N) and an access service class (ASC) of a current service that are in a system information block; calculating an access probability of the current service according to the N and the ASC of the current service; successively comparing random numbers corresponding to available access timeslots with the access probability of the current service until a random number corresponding to an available access timeslot is less than or equal to the access probability of the current service; and sending an access preamble to a base station in the available access timeslot. Embodiments of the present invention apply to establishment of a random access process for a mobile terminal.

12 Claims, 5 Drawing Sheets

---

A user terminal obtains a dynamic probability class N and an access service class ASC of a current service that are in a system broadcast message — S101

Calculate an access probability of the current service; where if the ASC of the current service is 0, a formula $P_0 = \dfrac{M + P(N)}{1 + M \times P(N)}$ is used to calculate the access probability of the current service — S102

Successively compare random numbers corresponding to available access timeslots with the access probability of the current service until a random number corresponding to an available access timeslot is less than or equal to the access probability of the current service, and send an access preamble to a base station in the available access timeslot — S103

(56) References Cited

FOREIGN PATENT DOCUMENTS

| CN | 101064922 A | 10/2007 |
|---|---|---|
| CN | 101848552 A | 9/2010 |
| EP | 2234418 A2 | 9/2010 |

OTHER PUBLICATIONS

Foreign Communication From a Counterpart Application, Chinese Application No. 201110251052.2, Chinese Office Action dated Apr. 1, 2015, 5 pages.

Foreign Communication From a Counterpart Application, PCT Application No. PCT/CN2012/073632, English Translation of International Search Report dated Jul. 5, 2012, 2 pages.

Foreign Communication From a Counterpart Application, PCT Application No. PCT/CN2012/073632, English Translation of Written Opinion dated Jul. 5, 2012, 8 pages.

Foreign Communication From a Counterpart Application, European Application No. 12741956.2, Extended European Search Report dated Apr. 17, 2014, 8 pages.

"Load Control for E-UTRA Non-synchronized Rach," 3GPP TSG-RAN WG1 #48, R1-071068 (R1-070317), Feb. 12-16, 2007, 4 pages.

"3rd Generation Partnership Project; Technical Specification Group Radio Access Network; Radio Resource Control (RRC); Protocol Specification (Release 9)," 3GPP TS 25.331, V9.7.0, Jun. 2011, 1800 pages.

* cited by examiner

RANDOM ACCESS METHOD, MOBILE TERMINAL, AND MOBILE COMMUNICATIONS SYSTEM

CROSS-REFERENCE TO RELATED APPLICATIONS

This application is a continuation of International Application No. PCT/CN2012/073632, filed on Apr. 9, 2012, which claims priority to Chinese Patent Application No. 201110251052.2, filed on Aug. 29, 2011, both of which are hereby incorporated by reference in their entireties.

TECHNICAL FIELD

The present invention relates to the communications field, and in particular, to a random access method, a mobile terminal, and a mobile communications system.

BACKGROUND

In a process in which a mobile terminal such as a User Equipment (UE) communicates with a network, no matter what type of service is initiated, a random access process needs to be initiated first, so that an Radio Resource Control (RRC) connection is established between the UE and an Radio Network Controller (RNC), thereby implementing data exchange between the UE and the network. The random access process specifically refers to that the UE obtains an access probability according to an Access Service Class (ASC), and randomly selects one or more available access timeslots from available access timeslots of a current cell of the UE according to the obtained access probability to send an access preamble to a base station (Node B) until the UE receives an acquisition indication from the base station.

The higher the access probability obtained through a calculation is, the more the randomly selected available access timeslots for sending the access preamble of the UE are, and therefore, the higher a possibility of service access success is. In addition, the ASC is used to indicate a priority of a service currently initiated by the UE. Generally, according to an importance or emergency level of a service, the ASC is classified into eight classes, which are specifically represented by eight digits 0 to 7. ASC=0 represents a highest priority, and a typical service is an emergency call; ASC=7 represents a lowest priority. In the prior art, when a service is an access service with the highest priority, such as an emergency call, that is, ASC=0, the obtained access probability is a fixed value 1. That is to say, regardless of a state of a current network or that of the UE, an access probability of a service whose ASC is 0 is always 100%.

However, due to a limited network capacity, access requirements of services with the highest priority, such as emergency calls, increase significantly when a special event, for example, a large-scale disaster event, occurs. This results in network congestion. In addition, because an access probability of each access service is 100%, an upper limit of the network capacity is exceeded. As a result, all access services with the highest priority are likely to fail simultaneously, and a communication network system is unavailable.

SUMMARY

Embodiments of the present invention provide a random access method, a mobile terminal, and a mobile communications system, so as to avoid a problem that access services with a highest priority simultaneously fail due to a limited network capacity when a relatively large number of the access services with the highest priority are required.

To achieve the preceding objective, the embodiments of the present invention adopt the following technical solutions:

In one aspect, a random access method is provided and includes: obtaining a dynamic probability class N and an access service class ASC of a current service that are in a system information block, where N is any integer from 1 to 8; calculating an access probability of the current service according to the dynamic probability class N and the ASC of the current service; where when the ASC of the current service is a highest priority, a preset parameter M is obtained, and the access probability of the current service is calculated according to a formula $$P_0 = \frac{M + P(N)}{1 + M \times P(N)},$$

where $P_0$ represents an access probability when the ASC of the current service is the highest priority, $P(N)=2^{-(N-1)}$, M is a real number, and $0 \le M \le 1$; and successively comparing random numbers corresponding to available access timeslots with the access probability of the current service until a random number corresponding to an available access timeslot is less than or equal to the access probability of the current service, and sending an access preamble to a base station in the available access timeslot.

In another aspect, a terminal device is provided and includes: an obtaining module configured to obtain a dynamic probability class N and an access service class ASC of a current service that are in a system information block; a storage module configured to store a preset parameter M; a calculating module configured to calculate an access probability of the current service according to the dynamic probability class N and the ASC of the current service, where in a case that the ASC in the obtaining module is a highest priority, the calculating module is specifically configured to read the preset parameter M in the storage module, and calculate the access probability of the current service according to a formula $$P_0 = \frac{M + P(N)}{1 + M \times P(N)},$$

where $P_0$ represents an access probability when the ASC of the current service is the highest priority, $P(N)=2^{-(N-1)}$, M is a real number, and $0 \le M \le 1$; and a comparing and sending module configured to successively compare random numbers corresponding to available access timeslots with the access probability of the current service until a random number corresponding to an available access timeslot is less than or equal to the access probability of the current service, and send an access preamble to a base station in the available access timeslot.

In still another aspect, a mobile communications system is provided and includes a mobile terminal and a base station, where the mobile terminal is configured to obtain a dynamic probability class N and an access service class ASC of a current service that are in a system information block; in a case that the ASC is a highest priority, calculate an access probability of the current service according to a formula $$P_0 = \frac{M + P(N)}{1 + M \times P(N)};$$

successively compare random numbers corresponding to available access timeslots with the access probability of the current service until a random number corresponding to an available access timeslot is less than or equal to the access probability of the current service; and send an access preamble to the base station in the available access timeslot, where $P_0$ represents an access probability when the ASC of the current service is the highest priority, $P(N)=2^{-(N-1)}$, M is a preset parameter, which is a real number, and $0 \leq M \leq 1$; and the base station is configured to send an acquisition indication to the mobile terminal after acquiring the access preamble sent by the mobile terminal.

The embodiments of the present invention provide a random access method, a mobile terminal, and a mobile communications system. In a case that an ASC of a current service is a highest priority, a preset parameter M is read, and an access probability of the current service is calculated according to a formula $$P_0 = \frac{M + P(N)}{1 + M \times P(N)};$$

and random numbers corresponding to available access timeslots are successively compared with the access probability of the current service until a random number corresponding to an available access timeslot is less than or equal to the access probability of the current service, and an access preamble is sent to a base station in the available access timeslot. M may be a parameter that is preset according to an actual requirement, and $0 \leq M \leq 1$. Therefore, when a relatively large number of access services with a highest priority are required, a calculated $P_0$ of each access service may be less than or equal to 100%, thereby controlling that not $P_0$s of all access services are 100%. In this way, an upper limit of a network capacity is not likely to be exceeded, a probability of network congestion is reduced, and a problem that access services with a highest priority simultaneously fail due to a limited network capacity can be solved.

BRIEF DESCRIPTION OF DRAWINGS

To illustrate the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
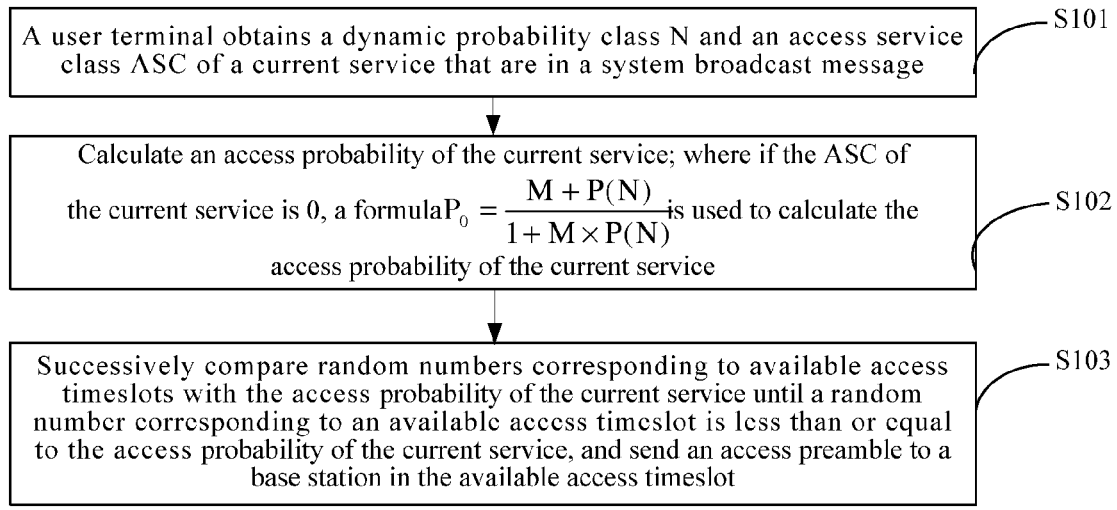
FIG. 1 is a schematic flowchart of a random access method according to an embodiment of the present invention.

A random access method is provided in an embodiment of the present invention. As shown in FIG. 1, the random access method includes the following steps:

It should be noted that an executing body of the following steps may be a mobile terminal, for example, a user terminal (such as a mobile phone).

S101: Obtain a dynamic probability class N and an access service class ASC of a current service that are in a system information block.

In all embodiments of the present invention, the dynamic probability class is represented by N, where N is any integer from 1 to 8. The dynamic probability class may be an allowed access class delivered by a network according to a current network congestion situation, and may be carried in a system information block System Information Block (SIB) 7.

In addition, the access service class ASC is generally classified, according to an importance or emergency level of a service, into eight classes, which are successively represented by digits 0 to 7 in descending order of priority. An ASC with a highest priority is 0, that is to say, ASC=0 represents the highest priority, a typical service is an emergency call; ASC=7 represents a lowest priority.

S102: Calculate an access probability of the current service according to the dynamic probability class N and the ASC of the current service.

When the ASC of the current service is the highest priority (that is, ASC=0), a preset parameter M is obtained, and the access probability of the current service is calculated according to a formula $$P_0 = \frac{M + P(N)}{1 + M \times P(N)},$$

where $P_0$ represents an access probability when the ASC of the current service is the highest priority, $P(N)=2^{-(N-1)}$, M is a real number, and $0 \leq M \leq 1$.

In a case that N=1, $P_0$ is always 1. N=1 indicates that a current network state is very good and network congestion hardly occurs. Therefore, there is no problem that access services with a highest priority simultaneously fail due to a limited network capacity when a relatively large number of the access services with the highest priority are required.

In a case that N≠1, and if M=0, $P_0=P(N)$; if M=1, $P_0$=100%; and if 0<M<1, $P(N)<P_0<$100%.

In all the embodiments of the present invention, the preset parameter M may be prestored in a memory of a mobile terminal, and a value of M may be prestored in the memory by the mobile terminal according to a network state. The preset parameter M may also be a parameter prestored in a memory of a mobile terminal by a mobile terminal manufacturer according to a requirement on an operator network planning state or different requirements of users for a service with a high priority. In this case, the mobile terminal may be enabled to read the parameter from the memory in a process of calculating $P_0$. Certainly, for the purpose of solving the problem that access services with a highest priority simultaneously fail due to a limited network capacity, though a value range of M is $0 \leq M \leq 1$, according to a preset requirement, not all M values read for calculating $P_0$s of all services whose ASCs are 0 are 1; that is, not all access probabilities $P_0$s of all services whose ASCs are 0 are 100%.

S103: Successively compare random numbers corresponding to available access timeslots with the access probability of the current service until a random number corresponding to an available access timeslot is less than or equal to the access probability of the current service, and send an access preamble to a base station in the available access timeslot.

A mobile terminal may obtain an available access timeslot of a current cell of the mobile terminal through system information block SIB5 or SIB6.

It can be learned from this step that the higher the access probability of the current service is, the higher a probability for sending an access preamble by the mobile terminal to the base station is, and therefore, the higher a possibility of random access success is. It can be learned from step S102 that in this embodiment of the present invention, that not $P_0$s of all access services are 100% may be controlled. In this way, during access of a large number of services with a highest priority, an upper limit of a network capacity is not likely to be exceeded, so that not only access of an access service with a highest priority is ensured, but also a communication network system is not caused to become unavailable, and the problem that access services with a highest priority simultaneously fail due to a limited network capacity can be solved.

Figure 2:
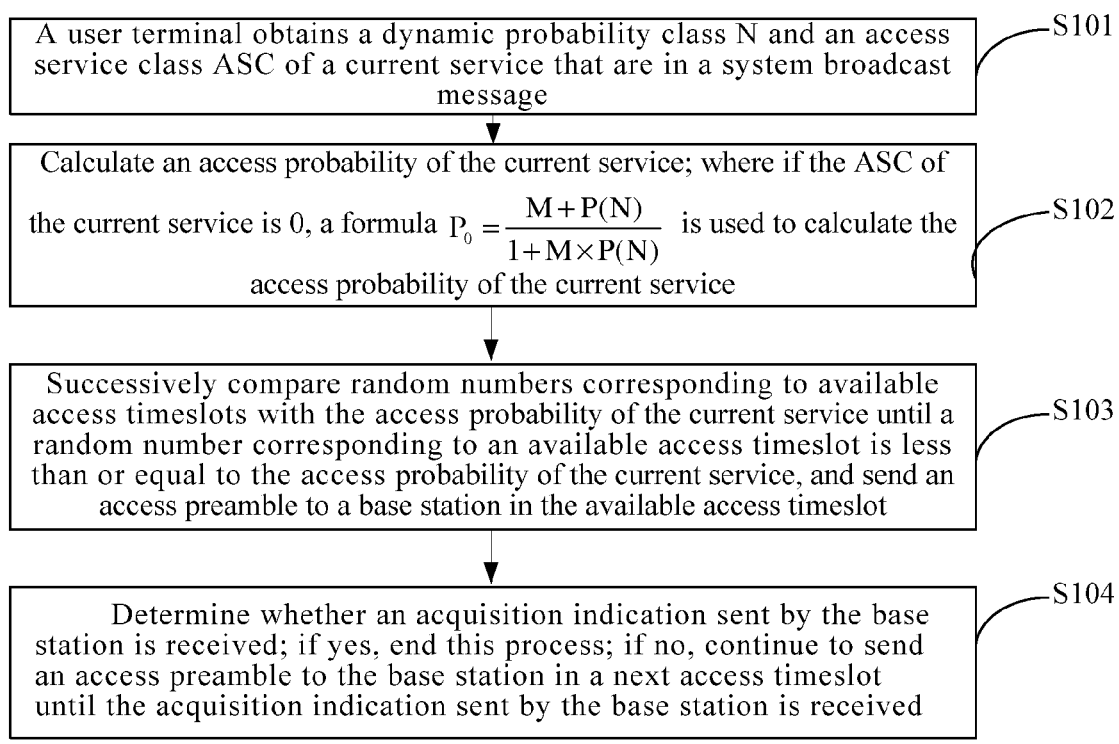
FIG. 2 is a schematic flowchart of another random access method according to an embodiment of the present invention.
Figure 3:
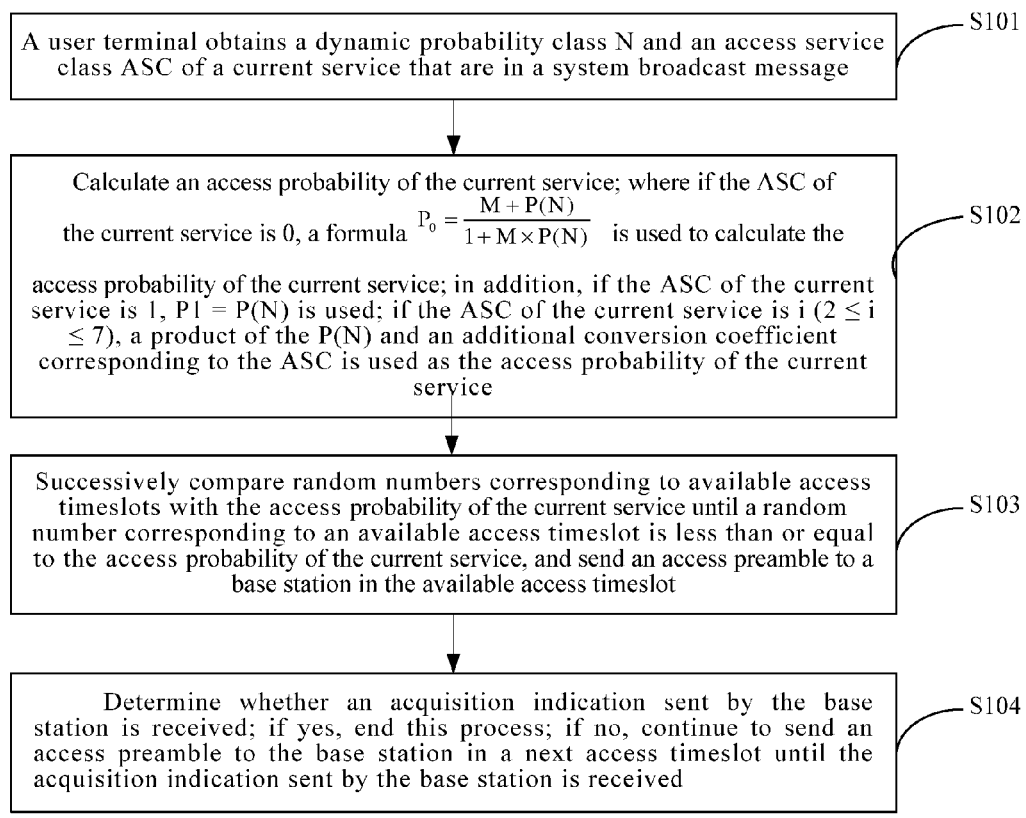
FIG. 3 is a schematic flowchart of still another random access method according to an embodiment of the present invention.

Further, as shown in FIG. 2, the preceding provided random access method further includes:

S104: Determine whether an acquisition indication sent by the base station is received.

If yes, end this process.

If no, continue to send an access preamble to the base station in a next access timeslot until the acquisition indication sent by the base station is received, where a random number corresponding to the next access timeslot is less than or equal to the access probability of the current service. In this case, step S103 may be specifically performed in a circular manner according to a sequence of the available access timeslots; in each cycle, an available access timeslot corresponding to a next random number that is less than or equal to the access probability of the current service may be obtained, and an access preamble is sent to the base station in the available access timeslot; and step S103 is performed in a circular manner until the acquisition indication sent by the base station is received.

Figure 4:
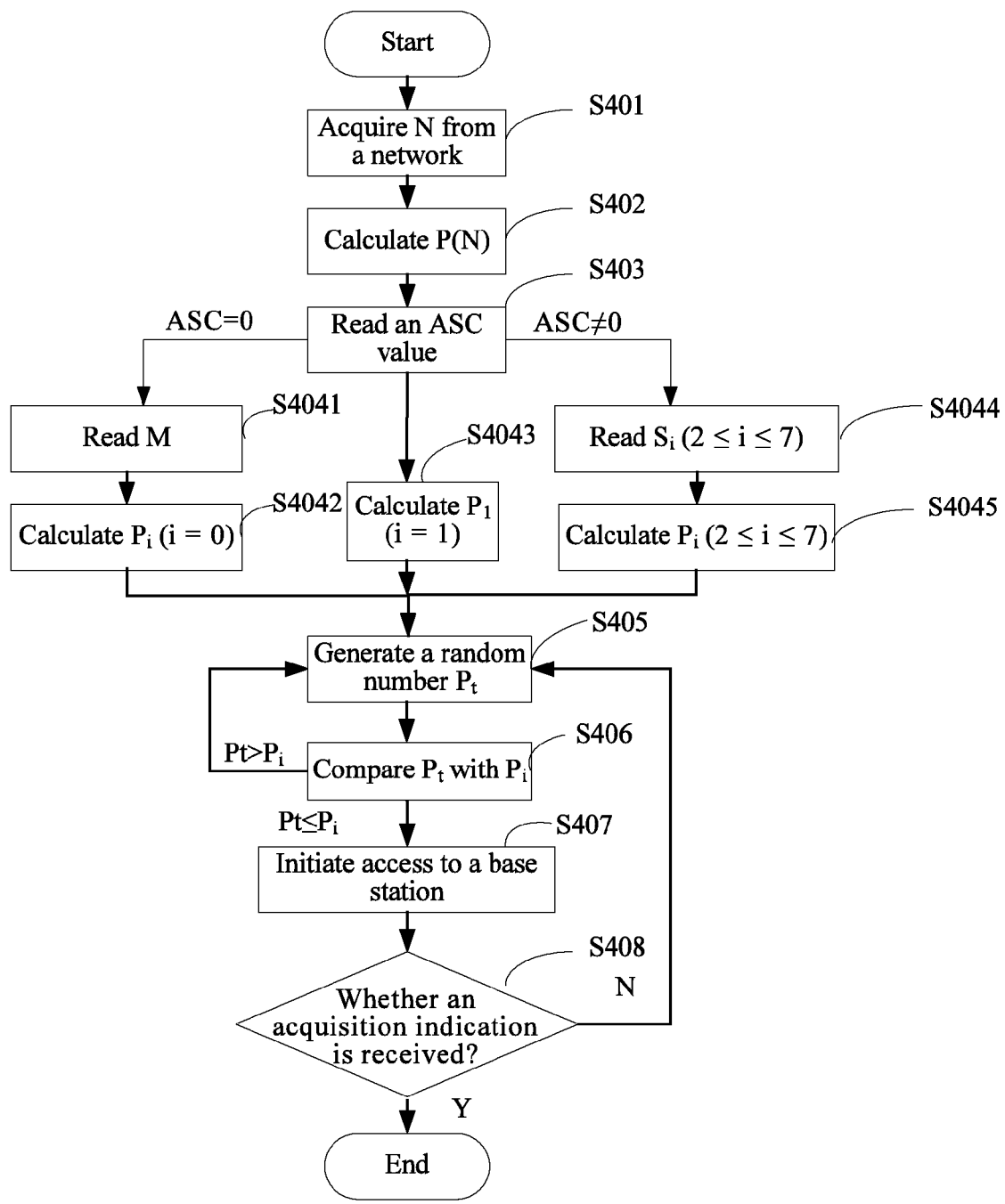
FIG. 4 is a schematic flowchart of still another random access method according to an embodiment of the present invention.

In addition, alternatively, as shown in FIG. 4, in step S102, when the ASC of the current service is 1, the access probability of the current service is the P(N); when the ASC of the current service is 2 to 7, the access probability of the current service is a product of the P(N) and an additional conversion coefficient corresponding to the ASC of the current service.

Additional conversion coefficients of ASCs from 2 to 7 are values obtained from the system information block, and each value is one of eight values from 0.2 to 0.9 in a step of 0.1.

Then, this embodiment of the present invention not only provides a random access method in a case that an ASC is 0, but also further provides a random access method in a case that an ASC is from 1 to 7. However, it should be noted that the preceding steps are not limited to the sequence shown by the mark numbers, and a sequence of content of the steps may be set according to an actual requirement.

The following provides another method that is different from the preceding random access method in a sequence, and gives detailed description with reference to FIG. 4. The method specifically includes the following steps:

S401: A mobile terminal obtains a dynamic probability class N in a system information block.

S402: Calculate P(N) according to a formula; regardless of a class of a current service, P(N) needs to be used to calculate an access probability of the current service, and therefore, a value of P(N) is calculated preferably in this embodiment.

S403: Read an ASC value of the current service, where in this embodiment, the ASC value refers to a digit used to represent a service ASC, and same as the service ASC in the preceding embodiment, is classified into eight classes, which are successively recorded as ASC=0 to ASC=7 in descending order of priority.

In this embodiment, i is used to represent the ASC value, where i is any integer from 0 to 7, and P represents an access probability of a service whose ASC is i. For example, $P_0$ represents an access probability of a service whose ASC is 0.

If the ASC of the current service is 0, perform steps S4041 to S4042 to calculate $P_0$ (that is, i=0).

S4041: Read a preset parameter M from a memory, where M is a real number and $0 \leq M \leq 1$.

S4042: Calculate the access probability of the current service according to a formula $$P_0 = \frac{M + P(N)}{1 + M \times P(N)},$$

where M is the value read in S4041, and P(N) is the value obtained through the calculation in S402.

If the ASC of the current service is 1 (that is, i=1), perform step S4043 to calculate $P_1$.

S4043: Use the value of P(N) obtained through the calculation in S402 as a value of $P_1$, that is, $P_1$=P(N).

If the ASC of the current service is i (herein, $2 \leq i \leq 7$), perform S4044 to S4045 to calculate P (herein, $2 \leq i \leq 7$).

S4044: Read, according to the ASC value of the current service, a conversion coefficient $S_i$ (herein, $2 \leq i \leq 7$) corresponding to the ASC, where $S_i$ represents a corresponding additional conversion coefficient when ASC=i.

S4045: Calculate the access probability of the current service according to a formula $P_i = S_i P(N)$, where $2 \leq i \leq 7$. For details about calculating an access probability of a service whose ASC is i ($2 \leq i \leq 7$), reference may be made to the following table:

| | i | | | | | |
|---|---|---|---|---|---|---|
| | 2 | 3 | 4 | 5 | 6 | 7 |
| Pi | $S_2P(N)$ | $S_3P(N)$ | $S_4P(N)$ | $S_5P(N)$ | $S_6P(N)$ | $S_7P(N)$ |

$S_2$ to $S_7$ are additional conversion coefficients when ASC=2 to ASC=7 respectively, and are values obtained from the system information block, each value (any one of values of $S_2$ to $S_7$) is one of eight values from 0.2 to 0.9 in a step of 0.1, and the values of $S_2$ to $S_7$ may be the same or different. In addition, P(N) is the value obtained through the calculation in S402.

After the access probability of the current service is obtained through the calculation through the preceding steps, continue to perform the following steps:

S405: The mobile terminal generates a corresponding random number $P_i$ ($0 \le P_t \le 1$) in an available access timeslot t, where t represents a serial number of an available access timeslot, $P_t$ represents a corresponding random number generated in a $t^{th}$ available access timeslot, and $P_t$ may be generated by a random number generator in the mobile terminal, and may also be a random number selected by the mobile terminal by using a software program.

S406: The mobile terminal compares the random number $P_t$ generated in the available access timeslot t with $P_i$ ($0 \le i \le 7$); if $P_t > P_i$, perform steps 405 to 406 in a circular manner until $P_t \le P_i$ and an available access timeslot in which an access preamble may be sent is obtained; if $P_t \le P_i$, perform step S407.

It should be noted that serial numbers of available access numbers are different in each cycle.

S407: The mobile terminal sends an access preamble to a base station in the available access timeslot determined in S406.

If the base station acquires the access preamble sent by the mobile terminal, the base station sends an acquisition indication to the mobile terminal.

S408: Whether the mobile terminal receives the acquisition indication sent by the base station; if no, a cycle starts from step S405, and the cycle ends until the mobile terminal receives the acquisition indication sent by the base station, which represents that random access is successful; if yes, random access is successful.

According to the random access method provided in this embodiment of the present invention, random access of services with various access service classes is described in detail, especially random access to a service whose ASC is 0, and that not $P_0$s of all access services are 100% may be controlled. In this way, an upper limit of a network capacity is not likely to be exceeded, and a problem that access services with a highest priority simultaneously fail due to a limited network capacity can be solved.

It should be noted that the random access methods in all the preceding embodiments may be implemented by using a software program module, and may also be implemented by using a hardware circuit, and certainly, a logical chip may also be used to cure algorithms in the preceding methods into the chip.

Figure 5:
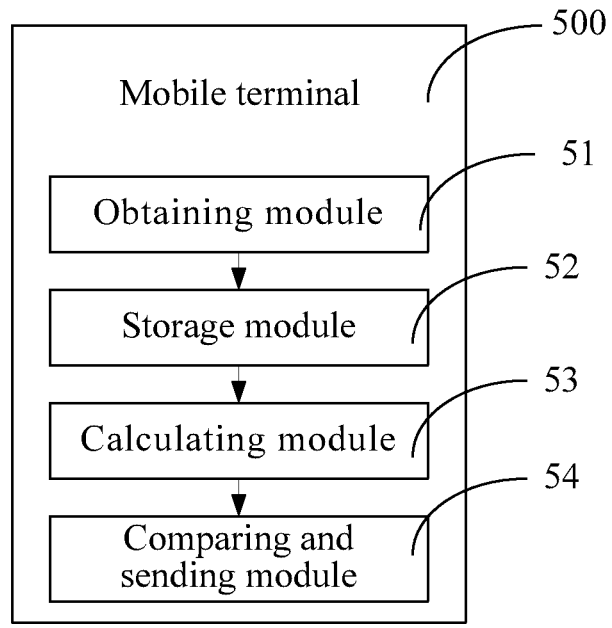
FIG. 5 is a schematic structural diagram of a mobile terminal according to an embodiment of the present invention.

As shown in FIG. 5, an embodiment of the present invention further provides a mobile terminal 500 corresponding to the preceding random access method. The mobile terminal 500 includes: an obtaining module 51 configured to obtain a dynamic probability class N and an access service class ASC of a current service that are in a system information block; a storage module 52 configured to store a preset parameter M; a calculating module 53 configured to calculate an access probability of the current service according to the dynamic probability class N and the ASC of the current service, where in a case that the ASC in the obtaining module 51 is a highest priority, the calculating module 53 is specifically configured to read the preset parameter M in the storage module, and calculate the access probability of the current service according to a formula $$P_0 = \frac{M + P(N)}{1 + M \times P(N)},$$

where $P_0$ represents an access probability when the ASC of the current service is the highest priority, $P(N)=2^{-(N-1)}$, M is a real number, and $0 \le M \le 1$; and a comparing and sending module 54 configured to successively compare random numbers corresponding to available access timeslots with the access probability of the current service until a random number corresponding to an available access timeslot is less than or equal to the access probability of the current service, and send an access preamble to a base station in the available access timeslot.

Figure 6:
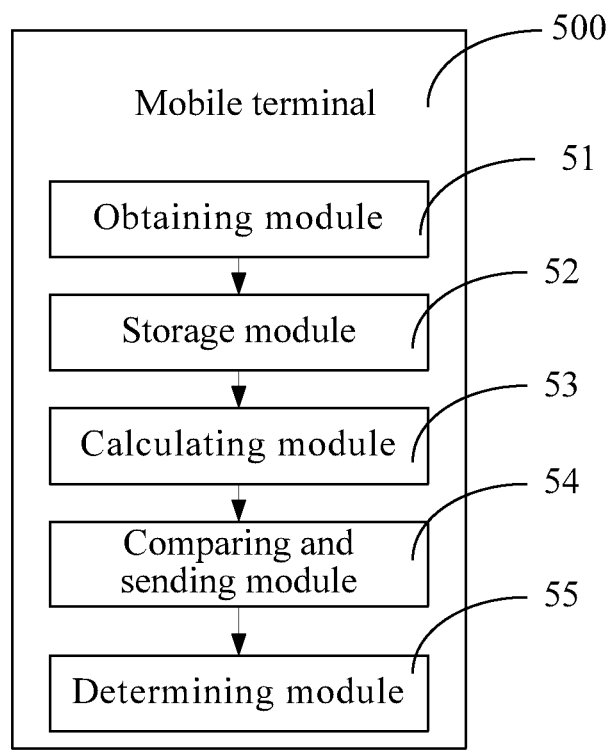
FIG. 6 is a schematic structural diagram of another mobile terminal according to an embodiment of the present invention.

Further, as shown in FIG. 6, the mobile terminal 500 further includes a determining module 55 configured to determine whether an acquisition indication sent by the base station is received; where if a determining result of the determining module 55 is yes, the comparing and sending module 54 stops working; and if the determining result of the determining module 55 is no, the comparing and sending module 54 is further configured to continue to send an access preamble to the base station in a next access timeslot until the mobile terminal receives the acquisition indication sent by the base station, and a random number corresponding to the next access timeslot is less than or equal to the access probability of the current service.

Further, in a case that the ASC of the current service is a non-highest priority, the calculating module 53 is specifically configured to calculate a product of the P(N) and an additional conversion coefficient corresponding to the non-highest priority to obtain the access probability of the current service. Preferably, the ASC is classified into eight classes, additional conversion coefficients of ASCs from 2 to 7 are values obtained from the system information block, and each value is one of eight values from 0.2 to 0.9 in a step of 0.1.

It should be noted that a function of each module of the mobile terminal provided in the present invention corresponds to each step of the preceding random access method.

According to the mobile terminal provided in this embodiment of the present invention, in a case that an ASC of a current service is a highest priority, a calculating module reads a preset parameter M, and calculates an access probability of the current service according to a formula $$P_0 = \frac{M + P(N)}{1 + M \times P(N)},$$

and a comparing and sending module is used to send an access preamble to a base station in a determined available access timeslot. M may be a parameter that is preset according to an actual requirement, and $0 \le M \le 1$. Therefore, when a relatively large number of access services with a highest priority are required, a calculated $P_0$ of each access service may be less than or equal to 100%, thereby controlling that not $P_0$s of all access services are 100%. In this way, an upper limit of a network capacity is not likely to be exceeded, and a problem that access services with a highest priority simultaneously fail due to a limited network capacity can be solved.

Figure 7:
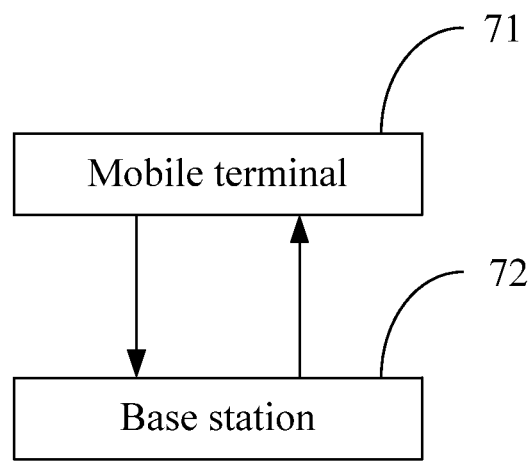
FIG. 7 is a schematic structural diagram of a mobile communications system according to an embodiment of the present invention.

As shown in FIG. 7, an embodiment of the present invention further provides a mobile communications system 700, including a mobile terminal 71 and a base station 72.

The mobile terminal 71 is configured to obtain a dynamic probability class N and an access service class ASC of a current service that are in a system information block; in a case that the ASC is a highest priority, calculate an access probability of the current service according to a formula $$P_0 = \frac{M + P(N)}{1 + M \times P(N)};$$

successively compare random numbers corresponding to available access timeslots with the access probability of the current service until a random number corresponding to an available access timeslot is less than or equal to the access probability of the current service; and send an access preamble to the base station in the available access timeslot, where $P_0$ represents an access probability when the ASC of the current service is the highest priority, $P(N)=2^{-(N-1)}$, M is a preset parameter, which is a real number, and $0 \leq M \leq 1$.

The base station 72 is configured to send an acquisition indication to the mobile terminal after acquiring the access preamble sent by the mobile terminal.

Further, the mobile terminal 71 is further configured to determine whether the acquisition indication sent by the base station is received; if yes, this process ends; if no, the mobile terminal is further configured to continue to send an access preamble to the base station in a next access timeslot until the acquisition indication sent by the base station is received, where a random number corresponding to the next access timeslot is less than or equal to the access probability of the current service.

According to the mobile communications system provided in this embodiment of the present invention, the mobile communications system includes a mobile terminal and a base station, where the mobile terminal reads a preset parameter M in a case that an ASC of a current service is a highest priority, calculates an access probability of the current service according to a formula $$P_0 = \frac{M + P(N)}{1 + M \times P(N)},$$

and sends an access preamble to the base station in a determined available access timeslot. M may be a parameter that is preset according to an actual requirement, and $0 \leq M \leq 1$. Therefore, when a relatively large number of access services with a highest priority are required, a calculated $P_0$ of each access service may be less than or equal to 100%, thereby controlling that not $P_0$s of all access services are 100%. In this way, an upper limit of a network capacity is not likely to be exceeded, and a problem that access services with a highest priority simultaneously fail due to a limited network capacity can be solved.

The preceding description is merely specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A random access method performed by a mobile terminal, comprising:
    obtaining, by the mobile terminal, a dynamic probability class (N) and an access service class (ASC) of a current service that are in a system information block, wherein N is any integer from 1 to 8;
    calculating, by the mobile terminal, an access probability of the current service according to the N and the ASC of the current service, wherein when the ASC of the current service is a highest priority, a preset parameter (M) is obtained and the access probability of the current service is calculated according to a formula $$P_0 = \frac{M + P(N)}{1 + M \times P(N)},$$

wherein $P_0$ represents an access probability when the ASC of the current service is the highest priority, wherein $P(N)=2^{-(N-1)}$, wherein M is a real number, and wherein $0 \leq M \leq 1$;
    successively comparing, by the mobile terminal, random numbers corresponding to available access timeslots with the access probability of the current service until a random number corresponding to an available access timeslot is less than or equal to the access probability of the current service, wherein $0 \leq$ random number $\leq 1$; and
    sending, by the mobile terminal, an access preamble to a base station in the available access timeslot,
    wherein calculating $P_0$ prevents failure to access the base station by a plurality of mobile terminals due to exceeded capacity for the service of the base station when the mobile terminals attempt to access a service of the base station and when the service has an ASC of the highest priority.

2. The random access method according to claim 1, further comprising:
    determining whether an acquisition indication sent by the base station is received; and
    continuing to send an access preamble to the base station in a next access timeslot until the acquisition indication sent by the base station is received when the acquisition indication sent by the base station is not received, wherein one of the random numbers corresponding to the next access timeslot is less than or equal to the access probability of the current service.

3. The random access method according to claim 1, wherein the ASC has eight classes that are represented by digits 0 to 7 in descending order of priority, wherein an ASC with a highest priority is 0, wherein the access probability of the current service is the P(N) when the ASC of the current service is 1, wherein when the ASC of the current service is 2 to 7, and wherein the access probability of the current service is a product of the P(N) and an additional conversion coefficient corresponding to the ASC of the current service.

4. The random access method according to claim 3, wherein additional conversion coefficients of ASCs from 2 to 7 are values obtained from the system information block, and wherein each value is one of eight values from 0.2 to 0.9 in a step of 0.1.

5. A mobile terminal, comprising:
    a computer processor configured to:
        obtain a dynamic probability class (N) and an access service class of a cu service that are in a system information block;
        store a preset parameter (M);
        calculate an access probability of the current service according to the N and the ASC of the current service when the ASC is a highest priority;
        read the stored M;
        calculate the access probability of the current service according to a formula $$P_0 = \frac{M + P(N)}{1 + M \times P(N)},$$

wherein $P_o$ represents an access probability when the ASC of the current service is the highest priority, wherein $P(N)=2^{-(N-1)}$, wherein M is a real number, and wherein $0 \leq M \leq 1$; and successively compare random numbers corresponding to available access timeslots with the access probability of the current service until a random number corresponding to an available access timeslot is less than or equal to the access probability of the current service, wherein $0 \leq$ random number $\leq 1$; and a transmitter coupled to the computer processor and configured to send an access preamble to a base station in the available access timeslot, wherein calculating $P_0$ prevents failure to access the base station by a plurality of mobile terminals due to exceeded capacity for the service of the base station when the mobile terminals attempt to access a service of the base station and when the service has an ASC of the highest priority.

6. The mobile terminal according to claim 5, wherein the computer processor is further configured to:

determine whether an acquisition indication sent by the base station is received;

stop comparing random numbers to available access timeslots and sending access preambles when the mobile terminal receives the acquisition indication from the base station; and continue to send an access preamble to the base station in a next access timeslot until the mobile terminal receives the acquisition indication sent by the base station when the acquisition indication sent by the base station is not received, and wherein one of the random numbers corresponding to the next access timeslot is less than or equal to the access probability of the current service.

7. The mobile terminal according to claim 5, wherein the ASC has eight classes that are represented by digits 0 to 7 in descending order of priority, wherein an ASC with a highest priority is 0, and wherein the computer processor is further configured to:

calculate the P(N) and use the P(N) as the access probability of the current service when the ASC of the current service is 1; and calculate a product of the P(N) and an additional conversion coefficient corresponding to the ASC of the current service to obtain the access probability of the current service when the ASC of the current service is 2 to 7.

8. The mobile terminal according to claim 7, wherein additional conversion coefficients of ASCs from 2 to 7 are values obtained from the system information block, and wherein each value is one of eight values from 0.2 to 0.9 in a step of 0.1.

9. A mobile communications system, comprising:

a mobile terminal comprising a computer processor configured to:

obtain a dynamic probability class (N) and an access service class (ASC) of a current service that are in a system information block;

calculate an access probability of the current service according to a formula $$P_0 = \frac{M + P(N)}{1 + M \times P(N)}$$

when the ASC is a highest priority;

successively compare random numbers corresponding to available access timeslots with the access probability of the current service until a random number corresponding to an available access timeslot is less than or equal to the access probability of the current service, wherein $0 \leq$ random number $\leq 1$; and a transmitter coupled to the computer processor and configured to send an access preamble to the base station in the available access timeslot, wherein $P_0$ represents an access probability when the ASC of the current service is the highest priority, wherein $P(N)=2^{-(N-1)}$, wherein M is a preset parameter and is a real number, wherein and $0 \leq M \leq 1$, and wherein a base station is configured to send an acquisition indication to the mobile terminal after acquiring the access preamble sent by the mobile terminal, wherein a default access probability of an ASC of the highest priority is 100 percent, wherein the access probability of the current service is less than or equal to the default access probability based on a density of communications traffic attempting to access the base station, and wherein the access probability of the current service being less than or equal to the default access probability prevents simultaneous failure of a plurality of mobile terminals to access the base station when each of the plurality of mobile terminals requests a current ser ice h an ASC of the highest priority.

10. The mobile communications system according to claim 9, wherein the computer processor is further configured to:

determine whether the acquisition indication sent by the base station is received; and send an access preamble to the base station in a next access timeslot until the acquisition indication sent by the base station is received when the acquisition indication sent by the base station is not received, wherein one of the random numbers corresponding to the next access timeslot is less than or equal to the access probability of the current service.

11. The mobile communications system according to claim 9, wherein the ASC has eight classes that are represented by digits 0 to 7 in descending order of priority, wherein an ASC with a highest priority is 0, wherein the access probability of the current service is the P(N) when the ASC of the current service is 1, and wherein the access probability of the current service is a product of the P(N) and an additional conversion coefficient corresponding to the ASC of the current service when the ASC of the current service is 2 to 7.

12. The mobile communications system according to claim 11, wherein additional conversion coefficients of ASCs from 2 to 7 are values obtained from the system information block, and wherein each value is one of eight values from 0.2 to 0.9 in a step of 0.1.

* * * * *